United States Patent [19]
Campbell et al.

[11] Patent Number: 5,318,759
[45] Date of Patent: Jun. 7, 1994

[54] MEMBRANE/PSA-DEOXO PROCESS FOR NITROGEN PRODUCTION

[75] Inventors: Michael J. Campbell, Clarence Center; Ravi Prasad, East Amherst; James Smolarek, Boston, all of N.Y.

[73] Assignee: Praxair Technology, Inc., Danbury, Conn.

[21] Appl. No.: 963,964

[22] Filed: Oct. 21, 1992

[51] Int. Cl.⁵ ............................................. C01B 21/00
[52] U.S. Cl. ................................................... 423/351
[58] Field of Search ................... 423/351, 239, 239 A

[56] References Cited
U.S. PATENT DOCUMENTS

| | | | |
|---|---|---|---|
| 4,781,907 | 11/1988 | McNeill | 423/351 |
| 4,960,579 | 10/1990 | Campbell | 423/351 |
| 5,077,029 | 12/1991 | Schaub | 423/351 |
| 5,122,355 | 6/1992 | Prasad et al. | 423/351 |

*Primary Examiner*—Gregory A. Heller
*Attorney, Agent, or Firm*—Alvin H. Fritschler

[57] ABSTRACT

A deoxo unit is operated with excess oxygen to produce high purity nitrogen from a partially purified stream passing from a membrane or pressure swing adsorption unit. Essentially complete fuel utilization is achieved in applications in which essentially oxygen-free nitrogen product is not required.

12 Claims, 1 Drawing Sheet

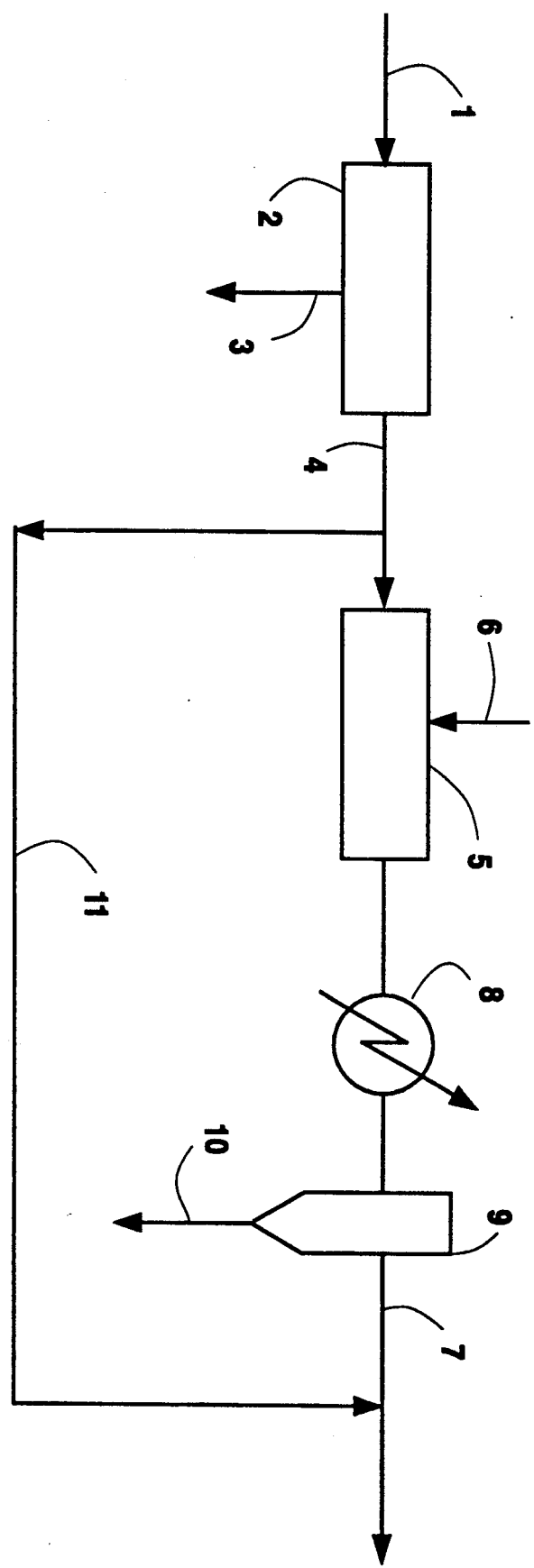

MEMBRANE/PSA-DEOXO PROCESS FOR NITROGEN PRODUCTION

FIELD OF THE INVENTION

The invention relates to the production of nitrogen. More particularly, it relates to a process for the production of high purity nitrogen with essentially complete utilization of fuel.

DESCRIPTION OF THE PRIOR ART

The production of high purity nitrogen has, for many years been carried out employing state of-the-art air separation technology based on cryogenic distillation techniques. Because of the favorable economics of scale up for such cryogenic distillation, large tonnage nitrogen users are supplied with nitrogen gas piped from a cryogenic plant installed on the users' site. Smaller tonnage users, i.e., 2–30 tons/day or less, are typically supplied with liquid nitrogen trucked to the users' site from a centrally located liquid nitrogen production plant. The cost of liquefying nitrogen gas and of transporting liquid nitrogen from an off-site cryogenic plant to the users' site will be seen to add significantly to the cost of the nitrogen as supplied to the user.

In recent years, therefore, a major challenge in the art has been to develop small tonnage air separation plants that can effectively produce low cost nitrogen gas at the users' site. Recent developments relating to pressure swing adsorption (PSA) and membrane technologies have served to significantly lower the cost of on-site systems for the production of relatively low purity, small tonnage nitrogen. On the other hand, high purity nitrogen cannot be economically produced by such PSA or membrane systems because of practical limitations rendering the power requirements and the cost of such systems prohibitive.

There is a desire in the art for the development of membrane or PSA systems and approaches capable of reducing the cost of on-site, high purity nitrogen. One approach that has been employed to reduce the cost of said on-site, high purity nitrogen involves the use of a membrane or PSA system coupled with a trace oxygen removal system for final purification of the nitrogen product. In this approach, a membrane or PSA system is used for initial air separation to produce nitrogen at up to 3,000 ppm of oxygen, or higher, with a catalyst system then being used to remove additional oxygen to produce a purified nitrogen product stream having a residual oxygen content of 10 ppm or less. While this approach enables high purity nitrogen to be produced on-site at a lower cost than by membrane or PSA systems alone, the cost saving achieved thereby nevertheless represents a marginal improvement over that associated with the supply of liquid nitrogen by truck to the users' site. This is primarily due to the relatively high cost of the hydrogen required to react with the oxygen present in the partially purified nitrogen stream for removal thereof. This approach could be of more practical commercial significance as compared to the trucking of liquid nitrogen, however, if a low-cost hydrogen supply source were available at the users' site and if the utilization of such hydrogen were to be enhanced.

There are presently a number of industrial applications, particularly in the petrochemical industry, which require high purity nitrogen and that also have low-cost hydrogen available on site. Frequently, however, this low cost, available hydrogen is impure and contains various hydrocarbons. The use of such impure hydrogen would be disadvantageous with respect to the operation of a catalyst system for final nitrogen purification. If such impure hydrogen were to be purified at relatively low cost, and the resulting high purity hydrogen used in an efficient and effective manner in said catalyst system for final, on-site nitrogen purification, the use of membranes and PSA systems for such applications would be enhanced.

The inherent simplicity of permeable membrane systems provides a strong incentive and desire in the art for the development of such systems and related processes for the on-site production of high purity nitrogen. Those skilled in the art will also appreciate that there are particular overall processing operations for which an on-site PSA system is more appropriate than a membrane system, despite the inherent simplicity of membrane systems. The desire in the art of improved overall membrane and PSA systems for on-site, high purity nitrogen production will thus be seen as involving, in approaches utilizing a catalyst system for final nitrogen production, the development of means to effectively utilize the low-cost, impure hydrogen frequently available at the user's site in the production of high purity nitrogen in a commercially feasible and efficient manner.

In a desirable approach described in the Campbell patent, U.S. Pat. No. 4,960,579, partially purified nitrogen recovered from an on-site membrane or PSA system is passed to a catalytic combustion system for final purification by reaction of the oxygen content thereof with a purified hydrogen stream. A separate membrane or PSA system is used to recover such a purified hydrogen stream from low cost, impure hydrogen available at the users' site. Such use of the separate systems and processes in an integrated manner enables the cost of producing high purity nitrogen to be significantly reduced, enhancing the feasibility of producing on-site, high purity nitrogen.

Such hybrid membrane (PSA)/deoxo systems are typically operated using excess fuel, e.g. hydrogen, in the deoxo process to ensure essentially complete removal of oxygen. The excess fuel also serves to act as a buffer against fluctuations in product flow and/or purity. In such otherwise desirable operations, complete utilization of the fuel is necessarily precluded, and undesirable fuel contaminants may also be present in the nitrogen product.

In many applications, it is found that the nitrogen product does not need to be essentially free of oxygen as is achieved in the operations described above, although the desired nitrogen may require a product purity beyond the economical range feasible in a stand alone membrane or PSA system. Such membrane or PSA systems typically provide nitrogen at purities of about 99.5% or less, and only rarely can provide purities of 99.6% or above. In such instances, it would be desirable to ensure essentially complete utilization of fuel in the deoxo process, to reduce operating costs and the presence of undesirable fuel contaminants in the product nitrogen.

It is an object of the invention, therefore, to provide an improved process for the production of nitrogen.

It is another object of the invention to provide a process utilizing membrane or PSA/deoxo systems for on-site nitrogen production with essentially complete utilization of fuel.

With these and other objects in mind, the invention as hereinafter described in detail, with the novel features thereof being particularly pointed out in the appended claims.

SUMMARY OF THE INVENTION

High purity nitrogen is produced in a membrane (PSA)/deoxo system in which excess oxygen is present in the deoxo unit. Essentially complete utilization of deoxo fuel is achieved, and the oxygen buffered hybrid system serves to obviate fluctuations in product flow and/or purity due to process upsets.

BRIEF DESCRIPTION OF THE DRAWING

The invention is hereinafter described in detail with reference to the drawing of an embodiment of a hybrid membrane/deoxo system of the invention.

DETAILED DESCRIPTION OF THE INVENTION

The objects of the invention are accomplished by operating a deoxo unit with excess oxygen in the processing of nitrogen removed from a membrane or PSA unit. This ensures the essentially complete utilization of deoxo fuel. In addition, depending on the fuel/catalyst combination employed in the deoxo unit, the stoichiometry of the oxygen-buffered hybrid membrane (PSA)/deoxo system may produce nitrogen product at closer to the desired purity than otherwise achieved without increased sensitivity to process upsets. The invention is particularly advantageous in the production of high purity nitrogen in the about 99.6% to about 99.99% range on a dry basis. Those skilled in the art will appreciate that said high purity nitrogen is an argon-containing stream.

The exothermic reaction of oxygen with hydrogen over a noble metal catalyst to form water vapor in a deoxo reaction is well known as indicated above. The stoichiometric equation for this reaction is:

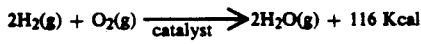

$$2H_2(g) + O_2(g) \xrightarrow{catalyst} 2H_2O(g) + 116 \text{ Kcal}$$

Typically, a supported palladium deoxo catalyst is employed, although platinum, ruthenium and nickel catalysts are also known to promote this reaction. As will be appreciated, two moles of hydrogen are consumed for every mole of oxygen removed. In hybrid PSA/deoxo systems, the PSA unit typically produces roughly 99.5 vol.% nitrogen from feed air, while a membrane unit typically produces roughly 98% nitrogen, i.e. 98 moles of nitrogen and 2 moles of oxygen. The catalytic deoxo unit removes essentially all of the remaining oxygen for the production of an "oxygen free" nitrogen, i.e. nitrogen with less than 5 parts per million on a volume basis (ppmv).

In conventional practice, about 1,000 to 4,000 ppmv of excess hydrogen, i.e. above the stoichiometric requirement for the indicated reaction, is provided both to drive the reaction to completion and to provide a buffer against fluctuations in product purity and for load tracking purposes. With proper load tracking and process control, the amount of such excess hydrogen in the product nitrogen can be reduced to about 750 to 1,000 ppmv.

As indicated above, however, such oxygen-free nitrogen is not required for many practical commercial operations, although the desired nitrogen purity level may be beyond the economically feasible range of either stand alone membrane or PSA units. In such cases, some residual oxygen is necessarily permitted in the product nitrogen. In the practice of the invention, the deoxo unit of a hybrid membrane (PSA) deoxo system is operated using from about 500 to about 4,000 ppmv of excess oxygen, depending on the product purity desired. Since one of the reactants in the above reaction, namely oxygen, is still in excess, the reaction will be driven to near completion with the nitrogen product thus containing only a negligible amount of the second reactant, i.e. less than 5 ppmv of hydrogen. As a result, nearly 100% utilization of expensive hydrogen fuel is achieved, while still providing a nitrogen product purity acceptable to the customer for use in applications not requiring oxygen free nitrogen. As will be appreciated by those skilled in the art, there are some nitrogen applications in which the presence of hydrogen in the product nitrogen is incompatible with the desired end use of the nitrogen. In such instances, the practice of the invention is superior to the conventional practice of using excess hydrogen for deoxo buffering purposes. Furthermore, since the reaction consumes two moles of hydrogen for every mole of oxygen, less excess reactant is required in the practice of the invention to provide an equivalent buffering capacity as compared to conventional practice. It should be understood that the invention is particularly advantageous in certain embodiments in which a hydrocarbon is used as deoxo fuel instead of using hydrogen fuel since, in such cases, the presence of excess oxygen may be necessary to drive the hydrocarbon reaction to completion and thus to avoid the formation of undesirable side products, such as CO.

The invention is desirably used to produce nitrogen product in the about 99.6% to about 99.99% purity range on a dry basis, with product purities of from about 99.7% to about 99.9% nitrogen being generally preferred for many applications. Excess oxygen concentrations would thus be in the about 4,000 to about 500 ppmv range, preferably about 3,000 to about 1,000 ppmv, respectively. Some argon, $CO_2$ and water vapor may also be present in the nitrogen product, but will generally be tolerable for the intended nitrogen purposes.

By contrast, the conventional deoxo operation using excess fuel generally produces about 99.9995% oxygen-free nitrogen.

As indicated above, the deoxo reaction is driven to near completion in the practice of the invention, with nearly complete utilization of the fuel, e.g. expensive hydrogen fuel. Since two moles of hydrogen fuel are consumed for every mole of oxygen used, the use of excess oxygen in the practice of the invention provides the same buffering capacity, at a lower residual concentration, than excess hydrogen. For a desired purity of about 99.8% nitrogen, i.e. 99.8 moles of nitrogen, 0.2 mole of oxygen, an air separation membrane unit would typically produce 98% nitrogen, i.e. 98 moles of nitrogen, 2 moles of oxygen. Upon passing the thus-partially purified nitrogen stream from the membrane unit to the deoxo unit, the partially purified nitrogen would be combined with, for example, 3.8 moles of pure hydrogen, which would serve to remove 1.9 moles of oxygen due to the 2/1 stoichiometric ratio of $H_2/O_2$ for the deoxo reaction. The resulting nitrogen product recovered from the deoxo unit would have a purity of 99.9% nitrogen, i.e. 98 moles of nitrogen, 0.1 mole oxygen, on a dry basis. The difference between the actual and the specified purity of the nitrogen product, that is, 0.2–0.1 or 0.1 mole of oxygen (which translates to 0.1% or 1,000 ppmv of oxygen in this example) represents the buffering capacity of the membrane/deoxo system. Thus, the hydrogen fuel flow to the deoxo unit could drop as much as 0.2% (0.2 mole or 2,000 ppmv in the example) without resulting in the production of off spec nitrogen product.

If the hydrogen employed in the example above were valued at $2/100 CF, then the added cost of operating with 1,000 ppmv excess hydrogen fuel, i.e. with 4.1 moles of hydrogen for 100 moles of the feed stream versus 3.8 moles of hydrogen, would be 0.6¢/100 CF of nitrogen product. It will be appreciated, therefore, that the economic benefits of using the oxygen buffered deoxo operation of the invention are not insignificant in the commercial practice of the invention.

If, in particular embodiments of the invention, a hydrocarbon fuel were employed instead of hydrogen fuel, the deoxo unit would likewise benefit from the oxygen buffering feature of employing excess oxygen therein. It will be appreciated that, frequently, the presence of relatively heavy hydrocarbon molecules in the nitrogen product is incompatible with the intended end use of the nitrogen product gas. In addition, the products of partial hydrocarbon combustion, e.g. carbon, CO, aldehydes and the like, are also generally undesirable components in the product nitrogen. Therefore, the operation of the invention would be desirable so as to minimize the presence of such undesirable materials in the product nitrogen.

As will be appreciated from the above, the invention can be practiced by introducing hydrogen or other deoxo fuel, i.e. hydrocarbons, such as methane, ethane and the like, to the deoxo unit in an amount insufficient to constitute the stoichiometric amount for removal of essentially all of the oxygen present in the partially purified nitrogen stream passing to said deoxo unit. In another processing option, it is possible to operate the deoxo unit with a feed bypass to achieve the desired excess oxygen condition and the resulting oxygen buffering capacity. This is illustrated in the accompanying drawing in which feed air is passed in line 1 to air separation membrane unit 2 in which oxygen is selectively permeated and removed from the unit through line 3. A partially purified nitrogen stream, e.g. containing 98% nitrogen and 2% oxygen, is withdrawn from membrane unit 2 in line 4 and passes therein to deoxo unit 5 for reaction with deoxo fuel introduced into the unit through line 6. A wet, purified nitrogen stream is recovered from the deoxo unit in line 7 and is passed therein to heat exchanger 8 and water separator unit 9 from which water is discharged in line 10. The thus dried, high purity nitrogen product stream, is recovered from line 7 for further processing or use as desired. Bypass line 11 is provided so as to enable a portion at the partially purified nitrogen stream in line 4 to bypass deoxo unit 5 to reduce the amount of product gas and deoxo fuel required to be introduced into the deoxo unit.

In the example described above for the production of 99.8% nitrogen with excess oxygen in the deoxo unit, the illustrated embodiment would be carried out by, for instance, feeding 95% of the partially purified nitrogen, e.g. 98% nitrogen, 2% oxygen, to the deoxo unit, with the other 5% of said nitrogen bypassing the deoxo unit by passage through line 11. The deoxo unit is then run to near completion, e.g. approximately 100 ppmv oxygen, without excess fuel. The purified nitrogen product from the deoxo unit is combined with the bypass stream to form 99.9% nitrogen product. This embodiment is of some benefit in reducing the size of the deoxo unit and the humidity of the product stream as well as in improving process control response to variations in product purity.

Those skilled in the art will appreciate that various changes can be made in the details of the invention without departing from the scope of the invention as set forth in the appended claims. Thus, the permeable membranes employed in the practice of the invention will commonly be employed in membrane assemblies typically positioned within enclosures to form a membrane module comprising the principal element of a membrane system. As understood with reference to the invention, a membrane system comprises a membrane module or a number of such modules, arranged for either parallel or series operation. The membrane modules can be constructed in convenient hollow fiber form, or in spiral wound, pleated flat sheet membrane assemblies, or in any other desired configuration. Membrane modules are constructed to have a feed air surface side and an opposite permeate gas exit side. For hollow fiber membranes, the feed air can be passed either onto the bore side or to the outer surface side of the hollow fibers.

It will also be appreciated that the membrane material employed for the air separation membrane and for the hydrogen purification membrane can be any suitable material capable of selectively permeating a more readily permeable component of the feed gas, i.e. air or impure hydrogen. Cellulose derivatives, such as cellulose acetate, cellulose acetate butyrate and the like; polyamides and polyimides, including aryl polyamides and aryl polyimides; polysulfones; polystyrenes and the like, are representative of such materials. Composite membranes, such as ethyl cellulose on a polysulfone substrate, are convenient for many air separation and other applications, as the material employed for the separation layer, which determines the separation characteristics of the composite, can be tailored to the particular performance requirements and operating conditions of a given application.

The PSA systems employed in the practice of the invention will typically comprise a number of adsorbent beds operated in accordance with processing cycles adapted to the number of beds actually employed, the applicable operating conditions and the desired performance requirements of a given application. The adsorbent material employed in each bed can be any suitable adsorbent material capable of selectively adsorbing a more readily adsorbable component of the feed air, while enabling the less readily adsorbable component of said feed gas to be withdrawn from the bed. Zeolite molecular sieve materials, such as 5A and 13X material, are convenient adsorbent bed materials for the equilibrium selective adsorption of impurities from an impure hydrogen stream and for the selective adsorption of nitrogen from feed air. Carbon molecular sieves, on the other hand, function in accordance with a different adsorption mechanism and, when used in air separation applications, result in the rate selective adsorption of oxygen as the more readily adsorbable component, with nitrogen being recovered as the less readily adsorbable component of feed air.

Those skilled in the art will appreciate that any well known, commercially available deoxo catalyst can be used in the final nitrogen purification operation. As with membrane and PSA systems, one or more catalyst stages can be employed in achieving the desired reaction of oxygen present in the nitrogen stream being purified with hydrogen or other fuel. As the reaction is exothermic in nature, suitable heat exchange means may be conveniently employed for efficient heat utilization in the reaction operation which occurs at a reaction temperature determined by the stoichiometry thereof, and being generally on the order of about 400° C.

The invention has been described herein for illustrative purposes with respect to on-site facilities, although it will be appreciated that the scope of the invention is not limited thereto. Such on-site facilities are typically deemed to denote the unique combination of separation and reaction systems, as herein disclosed and claimed herein, conveniently located on a user's site where high purity nitrogen is desired. It is within the scope of the invention, however, to position said on-site membrane (PSA) or deoxo reaction systems over-the-fence or at some other convenient location in proximity to, but not on, the premises referred to in another context as the user's site. It is also within the scope of the invention to position membrane (PSA) and deoxo units at a convenient location away from the user's site, with the high purity nitrogen being provided to the user's site conveniently as, for example, by pipeline.

The invention provides a highly desirable process for producing high purity nitrogen suitable for the increasing needs of refineries and other industrial operations. By reducing the deoxo fuel costs in applications where complete removal of oxygen is not required, the invention responds to an important need in the art, further enlarging the ever growing scope of membrane and PSA applications in satisfying the commercial need for products tailored to the particular needs of specific industrial applications.

We claim:

1. A process for the production of high purity nitrogen gas having a nitrogen purity of from about 99.6% to 99.99% from air comprising:
   (a) passing feed air to a membrane or pressure swing adsorption system for separation therein;
   (b) withdrawing a partially purified nitrogen stream containing residual oxygen and an oxygen rich discharge stream from the membrane or pressure swing adsorption system;
   (c) reacting a portion of the oxygen present in the partially purified nitrogen stream with a deoxo fuel in a catalytic combustion system, the amount of said deoxo fuel employed being such as to maintain excess oxygen conditions in the catalytic combustion system and produce a high purity nitrogen gas having a nitrogen purity of from about 99.6% to about 99.99%; and
   (d) recovering the high purity nitrogen gas stream from said catalytic combustion system, whereby high purity nitrogen, suitable for applications in which essentially complete removal of oxygen is not required, is produced with essentially complete utilization of the deoxo fuel.

2. The process of claim 1 in which said deoxo fuel comprises hydrogen.

3. The process of claim 1 in which said deoxo fuel comprises a hydrocarbon fuel.

4. The process of claim 1 in which the excess oxygen conditions in the catalytic combustion system comprises an excess oxygen concentration of from about 4,000 to about 500 ppmv of oxygen.

5. The process of claim 4 in which the excess oxygen concentration is from about 3,000 to about 1,000 ppmv.

6. The process of claim 4 in which said deoxo fuel comprises hydrogen.

7. The process of claim 4 in which said deoxo fuel comprises a hydrocarbon fuel.

8. The process of claim 1 in which the feed air is passed to a membrane system.

9. The process of claim 1 in which the feed air is passed to a pressure swing adsorption system.

10. The process of claim 1 and including diverting a portion of the partially purified nitrogen stream containing residual oxygen to by-pass said catalytic combustion system, and combining the portion of the nitrogen stream by-passing said catalytic combustion system with the high purity nitrogen gas stream recovered from the catalytic combustion system.

11. The process of claim 10 in which the reaction of residual oxygen present in the partially purified nitrogen stream with a deoxo fuel is carried out to near completion, without excess fuel, in the catalytic combustion system.

12. The process of claim 11 in which the high purity nitrogen gas stream recovered from the catalytic combustion system contains on the order of about 100 ppmv of oxygen.

* * * * *